United States Patent
Pannala et al.

(10) Patent No.: US 7,296,253 B2
(45) Date of Patent: Nov. 13, 2007

(54) METHOD AND APPARATUS TO GENERATE A WIRING HARNESS LAYOUT

(76) Inventors: Geetha Pannala, 8332 SW. Langtree St., Tigard, OR (US) 97224; Steve Geisler, 13448 NE. Denbrook Rd., Aurora, OR (US) 97002

( * ) Notice: Subject to any disclaimer, the term of this patent is extended or adjusted under 35 U.S.C. 154(b) by 218 days.

(21) Appl. No.: 10/045,523

(22) Filed: Oct. 19, 2001

(65) Prior Publication Data
US 2003/0079197 A1    Apr. 24, 2003

(51) Int. Cl.
*G06F 17/50*    (2006.01)
(52) U.S. Cl. .......................... 716/13; 716/14
(58) Field of Classification Search ............... 716/1–18
See application file for complete search history.

(56) References Cited

U.S. PATENT DOCUMENTS

| | | | | |
|---|---|---|---|---|
| 6,269,471 B1 * | 7/2001 | Yamano et al. | | 716/13 |
| 6,308,143 B1 * | 10/2001 | Segawa | | 703/1 |
| 6,349,403 B1 * | 2/2002 | Dutta et al. | | 716/12 |
| 6,353,918 B1 * | 3/2002 | Carothers et al. | | 716/8 |
| 6,434,721 B1 * | 8/2002 | Chiluvuri et al. | | 716/2 |
| 6,449,761 B1 * | 9/2002 | Greidinger et al. | | 716/11 |
| 6,457,165 B1 * | 9/2002 | Ishikawa et al. | | 716/12 |

OTHER PUBLICATIONS

U.S. Appl. No. 09/771,115, filed Jan. 25, 2001, Shropshire.
"Logical Cable", a Cabling Design & Analysis Datasheet published by Mentor Graphics, copyright © 2001.
"Capital H", a Cabling Design & Analysis Datasheet published by Mentor Graphics, copyright © 2001.
"The One-Minute Sale: Logical Cable™" published by Mentor Graphics.

* cited by examiner

*Primary Examiner*—Jack Chiang
*Assistant Examiner*—Binh Tat
(74) *Attorney, Agent, or Firm*—Klarquist Sparkman LLP

(57) ABSTRACT

A computer-implemented method includes inputting a netlist and generating symbols and connections formed according to the netlist and a selected wiring harness layout dimension. A wiring harness diagram is generated along the layout dimension according to the symbols and the connections.

41 Claims, 10 Drawing Sheets

METHOD AND APPARATUS TO GENERATE A WIRING HARNESS LAYOUT

TECHNICAL FIELD

This invention relates to the generation of symbols and layouts, and more particularly to the generation of symbols and layouts for wiring harnesses.

BACKGROUND

Connectivity between electrical, optical, and electromechanical components (circuit packages, fuse panels, circuit boards, electromechanical devices, etc.) may be accomplished by way of a wiring harness. A wiring harness is a collection of one or more wires directed in a more-or-less parallel fashion. One example of a wiring harness is a bundle of parallel, separately insulated wires that couple an automobile dashboard with the control electronics for the automobile's engine. Another example are the long bundles of wires that couple an airplane cockpit to the wing assembly, engines, tail assembly, and landing gear. Wiring harness diagrams may reduce an otherwise confusing collection of wires to a readable map of components and connections. Wiring harnesses may be represented using Computer Aided Design (CAD) diagrams. CAD diagrams may include many physical details of wires, couplings, and components. The process of manually producing CAD diagrams to represent wiring harnesses, and wiring schemes in general, is labor intensive.

Symbol diagrams reduce the components of a system to symbols, e.g. abstract shapes possibly including texture. Connections and couplings are likewise represented in an abstract fashion. Current methods to produce symbol diagrams for wiring harnesses rely upon CAD diagrams as a source of input information. Thus, before a symbol diagram can be produced, the prerequisite CAD diagram must be produced. One alternative to relying upon CAD diagrams for input is to manually arrange the components and connections of the symbol diagram. This may prove time consuming. A need therefore exists for a non-manual manner of producing symbol diagrams for wiring harnesses and similar wiring schemes which does not rely upon input from CAD diagrams.

SUMMARY

In one aspect, a computer-implemented method includes inputting a netlist and generating symbols and connections formed according to the netlist and a selected wiring harness layout dimension. A wiring harness diagram is generated along the layout dimension according to the symbols and the connections.

In another aspect, when at least one first pair of symbols of a netlist has been placed in a wiring harness layout, a next pair of symbols to place in the layout is selected which includes at least one symbol of the first pair. When there is at least one predefined symbol in the netlist, the next pair of symbols includes a pair of symbols having the highest connection strength and including a predefined symbol.

In yet another aspect, symbol placement is sequenced in a wiring harness layout at least in part according to the connectivity strength of at least one pair of symbols. A side of a first symbol on which to place a pin is selected to increase the directness of connectivity between the first symbol and a second symbol.

DRAWINGS

DESCRIPTION

Figure 1:
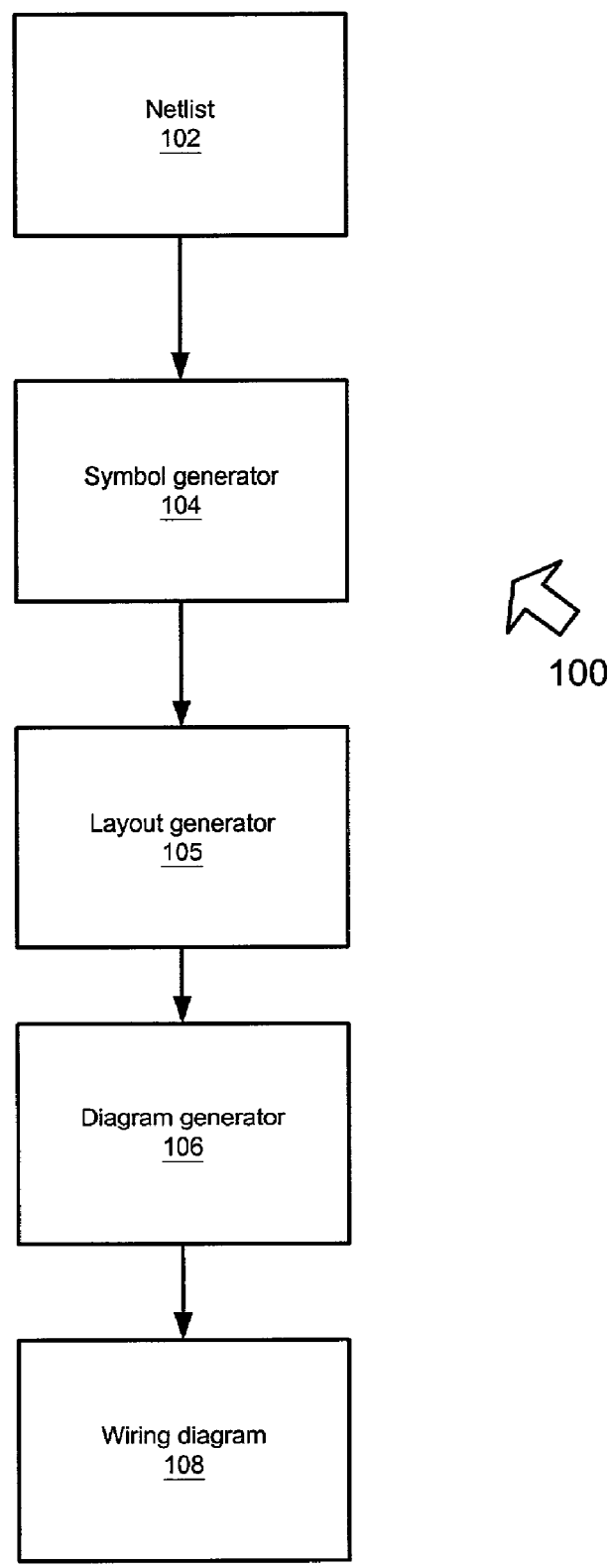
FIG. 1 is a block diagram of a system embodiment in accordance with the present invention.

FIG. 1 shows a system embodiment 100 in accordance with the present invention. A netlist 102 is provided to a symbol generator 104. A netlist is a collection of information identifying component pairs and their interconnection. The symbol generator 104 produces symbols comprising representations of components and pin locations on those components. The symbols are provided to a layout generator 105 which produces a layout comprising symbols in determined locations along a layout dimension. The layout is provided to a diagram generator 106 which produces a wiring diagram 108—a visual representation and/or file comprising connections between the symbols—according to the layout.

Figure 2:
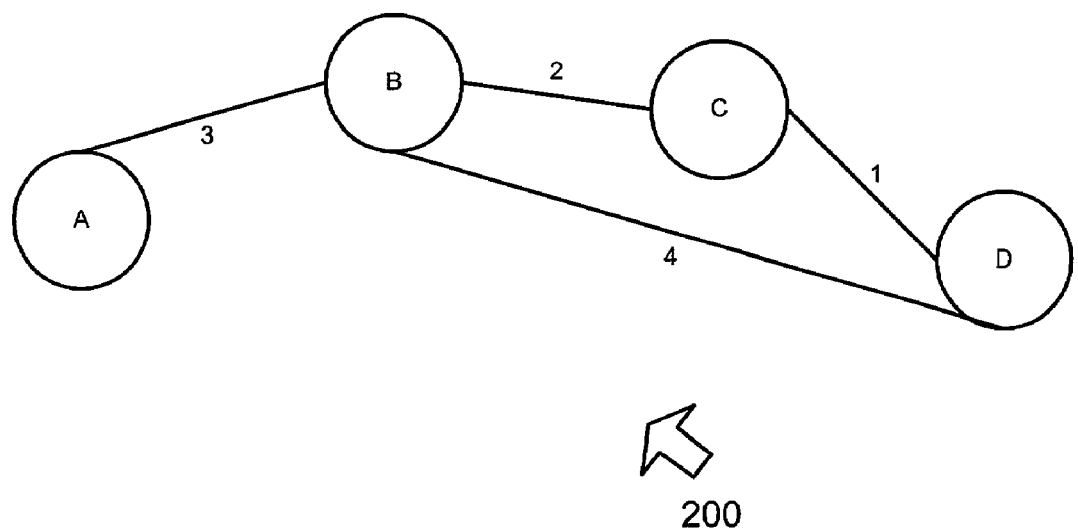
FIG. 2 is an illustration of an embodiment of a netlist in accordance with the present invention.

FIG. 2 shows an embodiment 200 of a netlist in accordance with the present invention. The netlist 200 comprises nodes A-D identifying components and their interconnection. Node pairs have an associated connection strength. The connection strength comprises a number of connections between the nodes. For example, netlist embodiment comprises node pairs (A,B), (B,C), (C,D), and (B,D) with connection strengths of 3, 2, 1, and 4, respectively.

Figure 3:
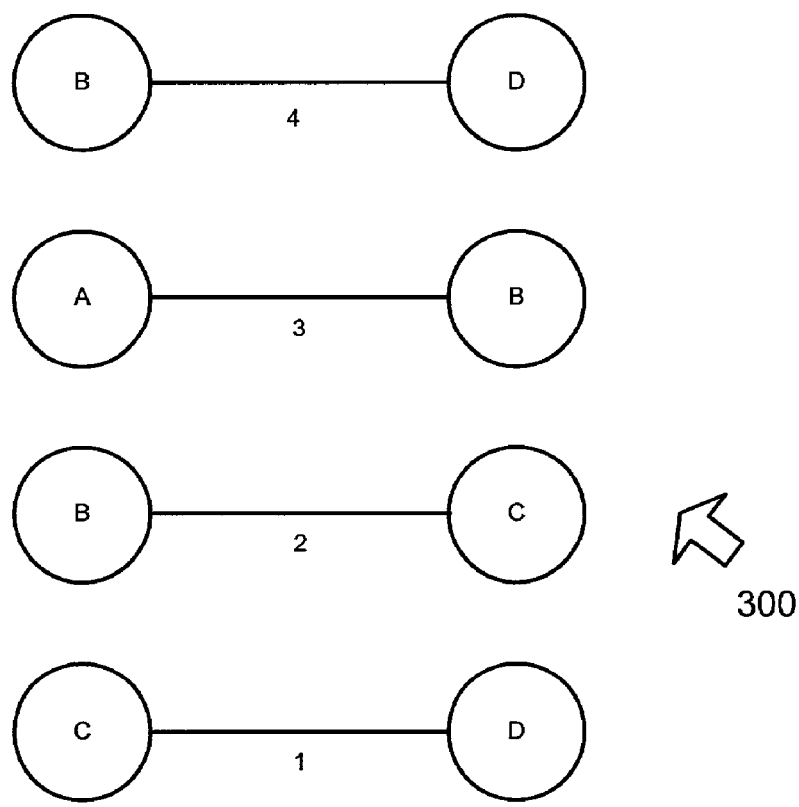
FIG. 3 illustrates an embodiment of a sorted representation of the netlist embodiment of FIG. 2.

FIG. 3 shows an embodiment 300 of a sorted representation of the netlist 200. Node pairs are sorted according to connection strength. Thus, pair (B,D) with connection strength 4 is sorted higher than node pair (A,B) with connection strength 3, and so on. Sorting the netlist according to the connection strength of node pairs may facilitate the generation of layouts and wiring diagrams, in a manner more fully described below. Sorting the netlist in this fashion may occur in some but not necessarily all embodiments of the present invention.

Figure 4:
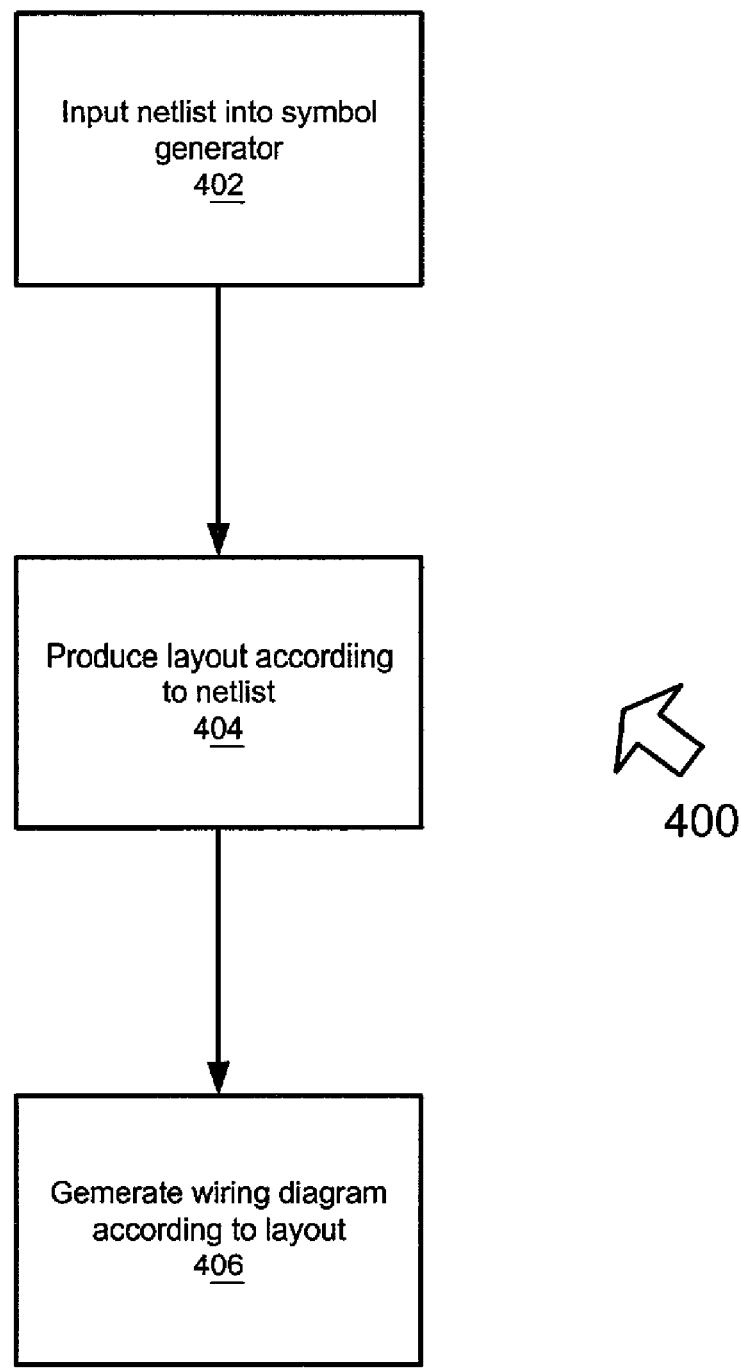
FIG. 4 is a flow chart which illustrates a method embodiment in accordance with the present invention.

FIG. 4 illustrates a method embodiment 400 in accordance with the present invention. At 402 a netlist is input to a symbol generator. A layout is produced in accordance with the netlist at 404. At 406, a wiring diagram is generated according to the layout.

Figure 5:
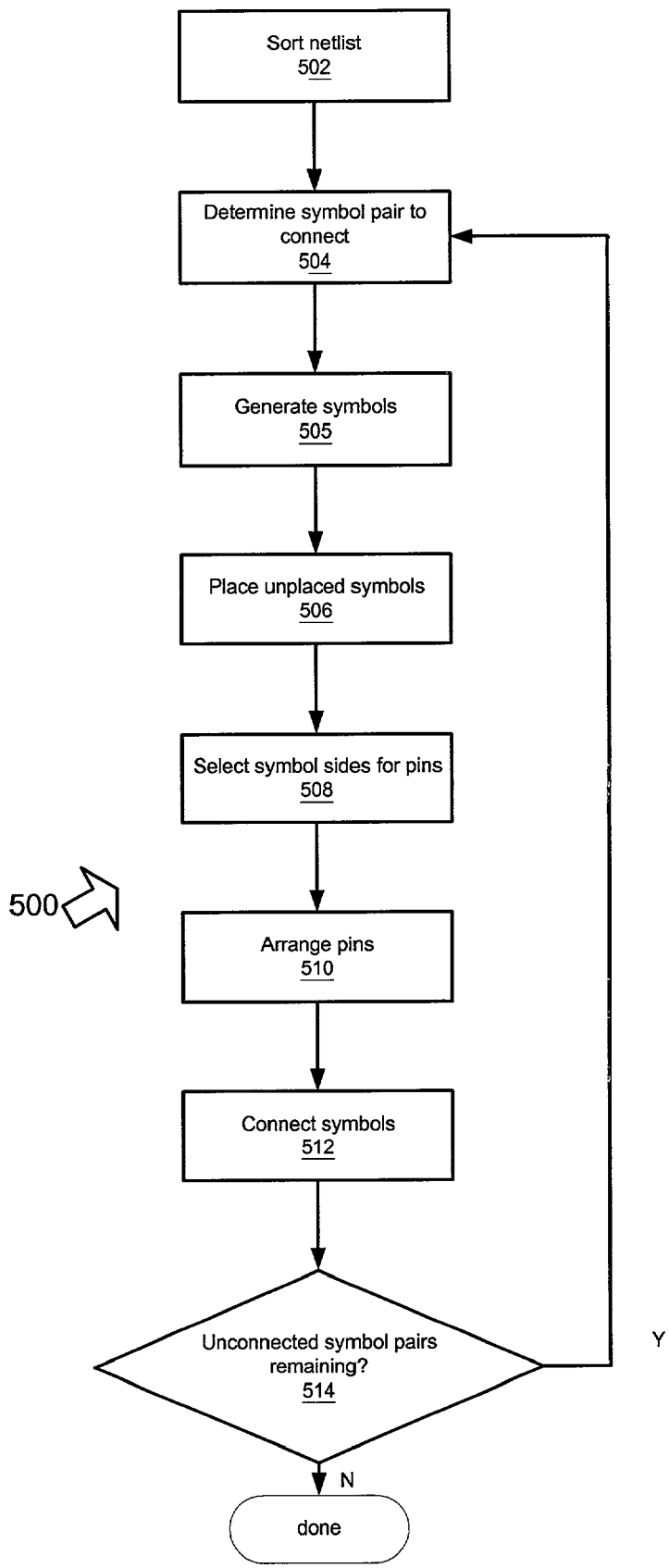
FIG. 5 is a flow chart which illustrates a method embodiment in accordance with the present invention.

FIG. 5 illustrates additional details of the method embodiment of FIG. 4. At 502 a sorted netlist is provided. At 504 the netlist is analyzed to select a component pair to operate upon. One or both of the components of the selected pair may already be placed in the layout. At 505 symbols are generated corresponding to any unplaced components of the pair. A symbol is an abstract representation of the component and may take the form of a simple geometric shape, such as a rectangle, ellispe, and so on. If predefined symbols are available for any of the components, the predefined symbols are used. Predefined symbols include symbols other than those generated by the symbol generator 104, such as symbols authored in a graphics or CAD program, or symbols from a library of predefined symbols. Predefined symbols may also be referred to as user-defined symbols.

At 506 any unplaced symbols of the selected pair are placed into the layout. At 508 one or more sides of the symbols may be selected for placement of the pins to connect between the symbols. A purpose of side selection is to increase the directness of connectivity between the symbols. What constitutes a 'side' of a symbol depends upon the shape selected for the symbol in the diagram. For example, a rectangular or square symbol may have straight, parallel sides. Curved symbols such as circles and ellipses may have 'sides' defined as hemispheres or other subsections of the perimeter of the curve. The selection of a side at 508 may not take place in every instance. In particular, if a symbol is predefined the selection of a side for placement of pins may not take place. The treatment of predefined symbols is discussed more fully in conjunction with FIGS. 6-9.

At 510 the pin locations are arranged along the selected sides of the symbols. The term 'pin' refers to locations of intersection between a symbol and a connection. A pin may be represented graphically, or implicitly by the intersection of a symbol graphic (box, ellipse, etc.) and a line or other graphic representing a connection. As with the selection of symbol sides to locate pins, the arrangement of pins may act to increase the directness of connectivity between the symbols. Again, pin arrangement may not take place for predefined symbols.

The location and arrangement of pins on symbols may not directly correspond to the physical location and layout of connection couplings on the components. Thus, it may be possible to select a side of the symbol for placement of particular pins which increases the directness of connectivity between the symbol and another symbol of the layout. This may result in a more readable wiring diagram. The selection of a symbol side for a pin may be made without strict adherence to the physical location of the coupling on the component. The locations and spacing of the pins on a side may also be adjusted to remove connection crossovers and jogs from the layout.

However, that when symbols are predefined, it may be undesirable to locate and arrange pins without regard to their physical position on the component. Relocation and rearrangement of predefined pin locations may result in obfuscation or confusion with regard to the predefined symbol. In other words, it may be desirable to treat pin locations of predefined symbols as immutable during generation of the layout.

Connections are produced between the symbols at 512. Well-known channel-routing techniques may be employed to form lines representing the connections between symbols. If there are remaining unconnected symbol pairs at 514, the method returns to 504.

Figure 6:
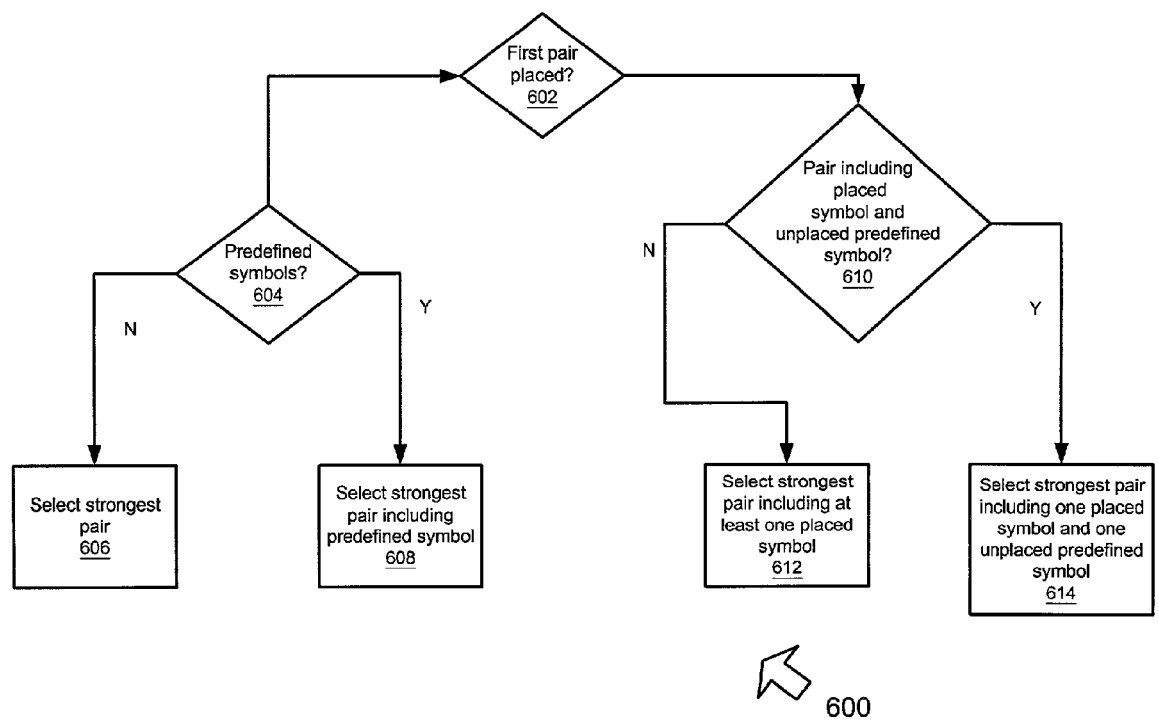
FIG. 6 is a flow chart which illustrates a method embodiment to select a symbol pair in accordance with the present invention.

FIG. 6 illustrates a method embodiment 600 to select a symbol pair in production of the layout, in accordance with the present invention. If, at 602, a first symbol pair has been placed in the layout, it is determined at 610 whether there are symbol pairs comprising (a) an already placed symbol, and (b) an unplaced predefined symbol. If not, a pair of symbols is selected at 612 having (a) at least one symbol of the pair which has already been placed, and (b) having the highest connection strength between them from among all such pairs. If there exists at least one symbol pair comprising (a) an already placed symbol, and (b) an unplaced predefined symbol, a pair of symbols having the highest connection strength is selected from among such all pairs at 614.

Referring again to 602, if no first symbol pair has been placed, it is determined at 604 whether there are any predefined symbols. If not, the pair of symbols having the highest connection strength is selected at 606. If there are no predefined symbols, a pair of symbols is selected which includes (a) a predefined symbol, and (b) the highest connection strength among pairs comprising a predefined symbol.

Figure 7:
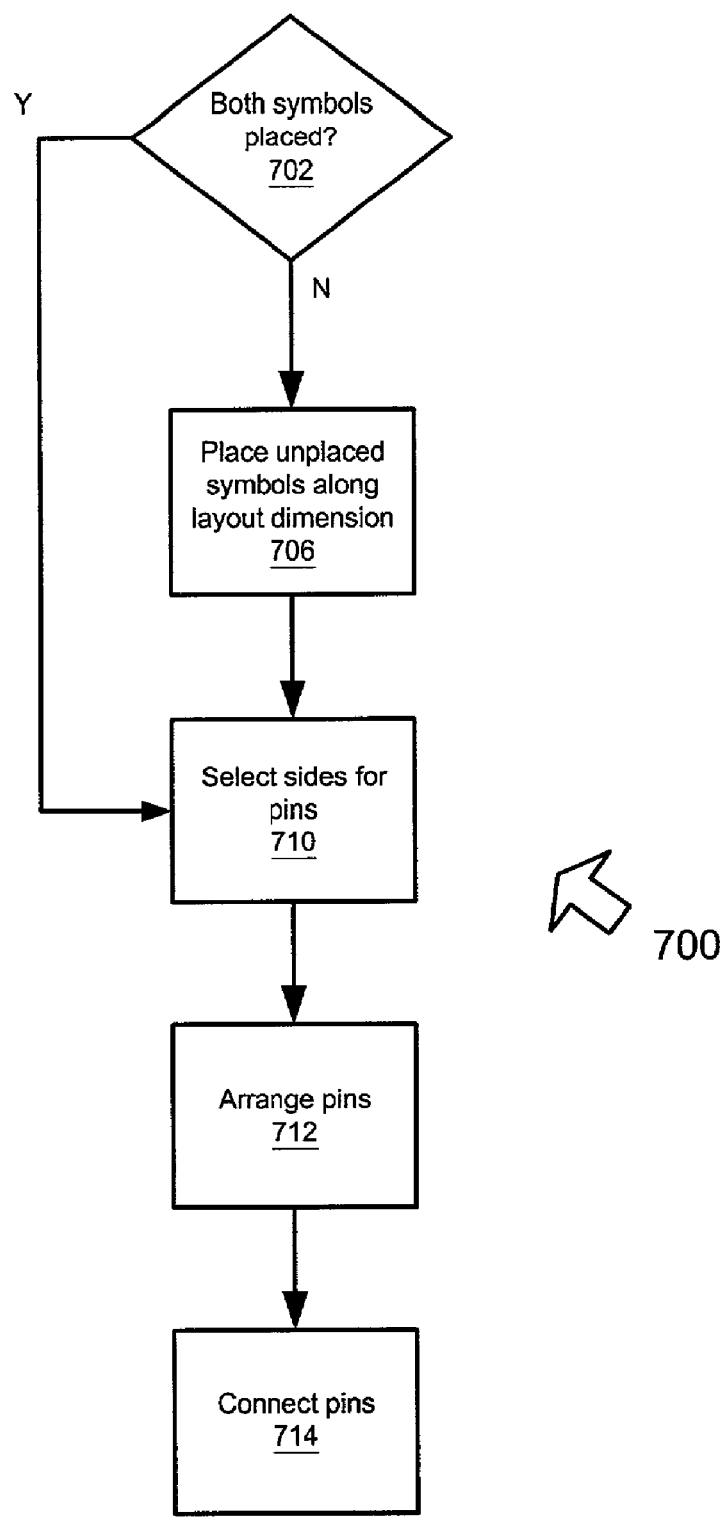
FIG. 7 is a flow chart which illustrates a method embodiment to apply a selected symbol pair in accordance with the present invention.

FIG. 7 shows a method embodiment 700 to apply a selected symbol pair in accordance with the present invention. At 702 it is determined whether both symbols of the pair have already been placed. If not, the unplaced symbols are placed along the layout dimension at 706. The layout dimension is a general direction along which the placement of symbols and the routing of connections is to proceed. For a wiring harness, the layout dimension represents the general direction in which the conductors are routed along the length of the harness. The layout dimension may be selectable. For example, it may be possible to select to lay out components and connections horizontally or vertically.

Once placed, sides are selected on the symbols at 710 for the placement of the pins which connect the symbols. As previously noted, side selection may not take place for predefined symbols. At 712 the pins that connect the symbols may be arranged to increase the directness of the connection between the symbols. Again, pin arrangement may not take place for predefined symbols. The pins are connected at 714.

The sides of the symbols for placement of the pins may be selected to face one another. For example, if neither symbol is predefined, and the layout dimension is horizontal, the left side of the first symbol and the right side of the second symbol may be selected for placement of the pins which connect the symbols. When neither symbol is predefined, and the layout dimension is vertical, the bottom side of the first symbol and the top side of the second symbol may be selected for placement of the pins which connect the symbols. Where one symbol of the pair is predefined and the other is not, the side of the non-predefined symbol may be selected which faces the side on the predefined symbol with pins to connect.

Figure 8:
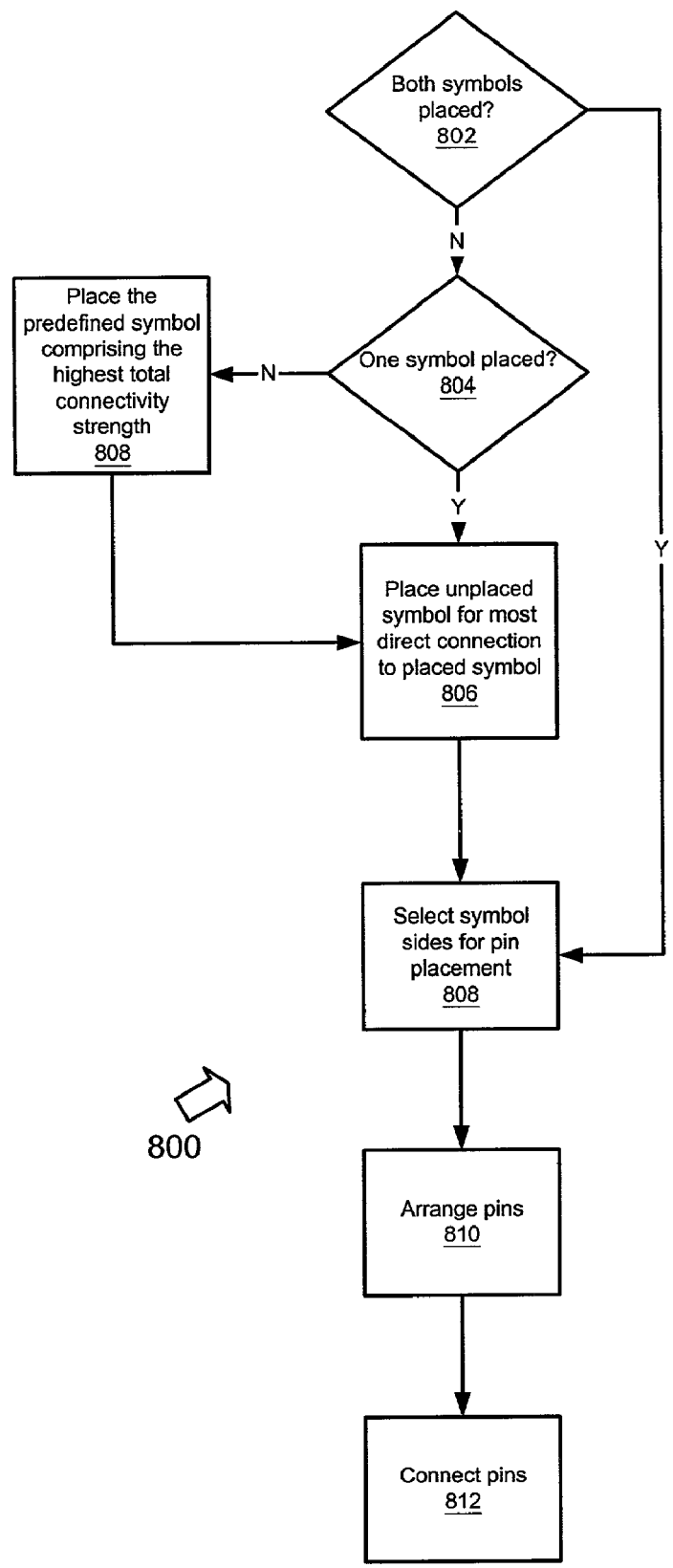
FIG. 8 is a flow chart which shows a method embodiment in accordance with the present invention

FIG. 8 shows a method embodiment 800 in accordance with the present invention. Method 800 may be employed to process symbol pairs including a predefined symbol. At 802 it is determined whether both symbols of a selected symbol pair have been placed. If both symbols have been placed, sides of one or both symbols may be selected for pin placement at 808. The pins are arranged and connected at 810 and 812, respectively. Again, side selection and pin arrangement may not take place for the one or both symbols of the pair which are predefined. If both symbols have not been placed, it is determined at 804 whether one of the symbols was placed. If not, the predefined symbol of the pair with the highest 'total connectivity strength' is placed. Total connectivity strength is a measure of the total number of connections between a symbol and all other symbols to which the symbol connects. For example, a symbol with three connections to a first other symbol and two connections to a second other symbol has a total connectivity strength of five.

If one symbol was already placed, at 806 the unplaced symbol is placed, if possible, to provide direct connection with the placed symbol. Again, this may involve placing the unplaced symbol according to the layout dimension such that the sides of the two symbols comprising the pins to connect face one another. Where both of the symbols are predefined, it may not be possible to effect placement such that the sides to connect face one another. The method then proceeds to 808 to select the sides for pin placement.

Figure 9:
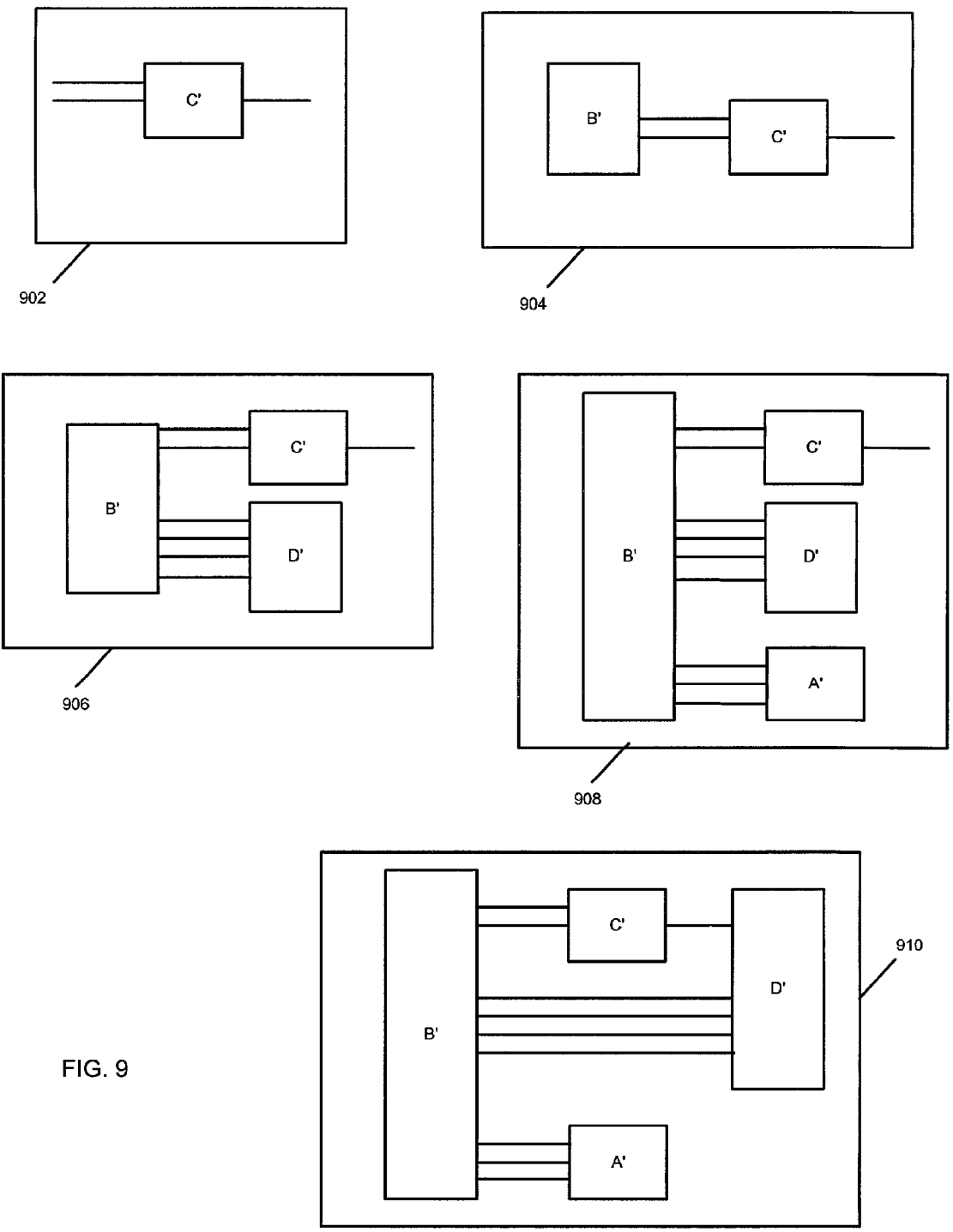
FIG. 9 illustrates one embodiment of stages to produce a wiring diagram from the netlist embodiment of FIG. 2.

FIG. 9 illustrates one embodiment of stages to produce a wiring diagram from the netlist embodiment 200 of FIG. 2, in accordance with the present invention. Netlist 200 comprises component C and a corresponding predefined symbol C'. Symbols A', B', and D' corresponding to the components A, B, and D may be generated by the symbol generator 104. Stages 902 and 904 show the selection of a first symbol pair (B',C') for placement in the layout. Symbol C' is the only predefined symbol in the netlist embodiment 200, hence, it is selected for placement first (see FIG. 6). Symbol C' has a connectivity strength of two with symbol B' and a connectivity strength of one with symbol D'. Hence, B' is paired with C' as the first symbol pair to place (see 608 in FIG. 6). Symbols B' and C' are placed along the layout dimension—horizontal in the illustrated embodiment. Symbol B' is placed to the left of C' because the pin positions of C' (a predefined symbol) are immutable, and placing B' to the left produces more direct connections. Pins to connect with C' are located on the right side of the symbol B' to increase the directness of the connections with the pins to connect on C'.

No other unplaced predefined symbols exist in the netlist 200, thus at 906 a next symbol pair (B',D') is selected for placement. This pair comprises a previously placed symbol B' and the symbol D' with which B' has the highest connectivity strength (see 612). Although symbol D' is illustrated in placement to the right of symbol B', placement of D' could also be left of B' because both symbols are not predefined, and either side of the symbols may be selected for pin placement. Pin positions on B' and D' are arranged such that the connections between the symbols are directly horizontal. There may be instances when symbol placement results in connections with angles dogs) and crossovers, however, pin arrangement may be employed to decrease such jogs and crossovers and hence increase the directness of connectivity between the symbols.

At 908 a symbol pair including previously placed symbol B' and unplaced symbol A' is selected, again according to 612. Symbol B' may be extended in height to accommodate additional pins on the right side to connect with symbol A'. Finally, at 910 pair (A',D') is selected, completing the layout embodiment. D' is placed to the right of C' because the pin on C' to connect appears on the right side of C'. Thus placing D' to the right of C' provides a direct connection. Although A' is placed to the right of B', it could also be placed to the left of B' y placing the two pins of B' connecting to A' would be placed on the left side of B', and placing the two pins on A' connecting to B' on the right side of A'

In some embodiments, arranging the pins to increase the directness of connections between symbols may involve resizing and repositioning one or more symbols. For example, from 904 to 906 the size of symbol B' is modified to accommodate an arrangement of pins which increases the directness of the connection with symbol D'. Likewise, between 908 and 910 the size and position of D' is modified to accommodate an arrangement of pins which increases the directness of the connection with symbols B' and C'.

Figure 10:
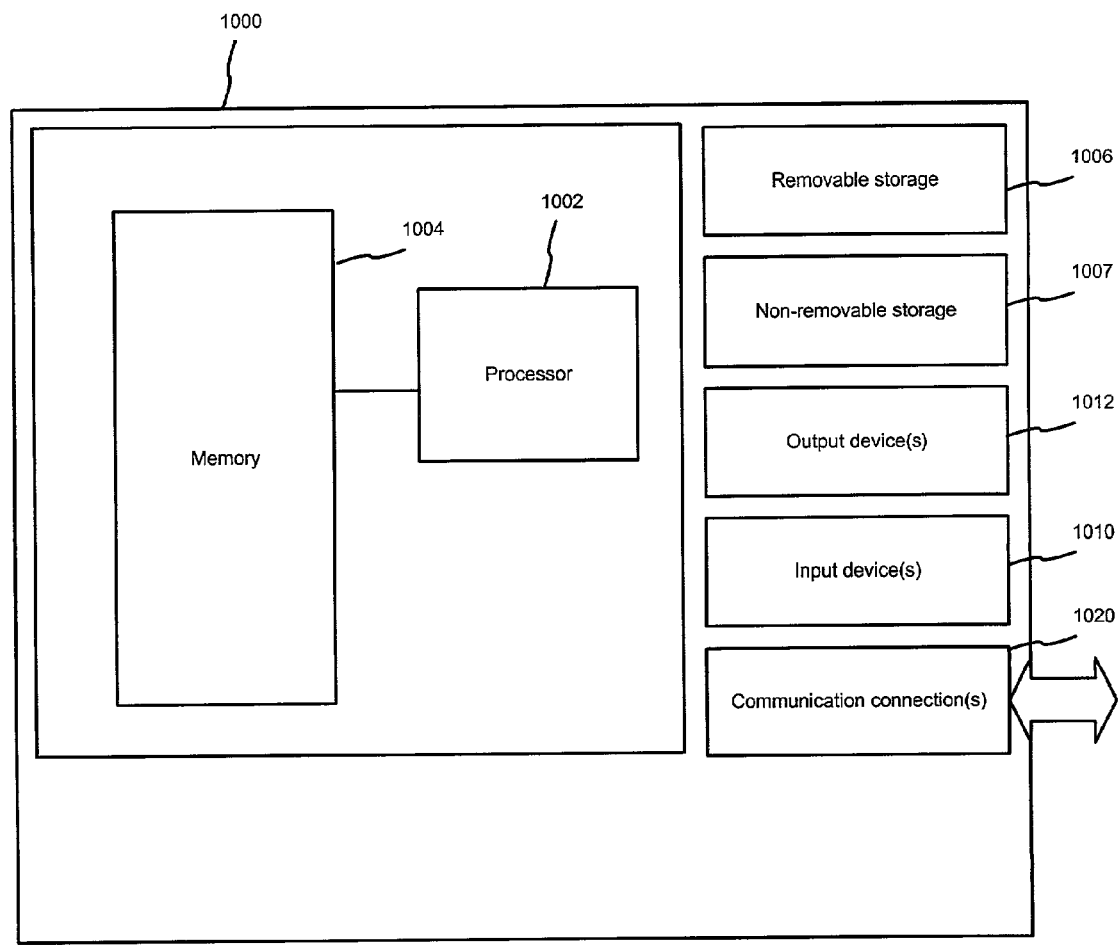
FIG. 10 is a block diagram which illustrates an apparatus embodiment for practicing embodiments of the present invention.

FIG. 10 illustrates an apparatus embodiment 1000 for practicing embodiments of the present invention. The apparatus 1000 comprises a processing unit 1002 (e.g., a processor, microprocessor, micro-controller, etc.) and machine-readable media 1004. Depending on the configuration and application (mobile, desktop, server, etc.), the memory 1004 may be volatile (such as RAM), non-volatile (such as ROM, flash memory, etc.) or some combination of the two. By way of example, and not limitation, machine readable media 1004 may comprise volatile and/or nonvolatile media, removable and/or non-removable media, including: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information to be accessed by the apparatus 1000. The machine readable media 1004 may be implemented in any method or technology for storage of information such as computer readable instructions, data structures, program modules or other data. Such instructions and data may, when executed by the processor 1002, carry out embodiments of methods in accordance with the present invention.

The apparatus 1000 may comprise additional storage (removable 1006 and/or non-removable 1007) such as magnetic or optical disks or tape. The apparatus 1000 may further comprise input devices 1010 such as a keyboard, pointing device, microphone, etc., and/or output devices 1012 such as display, speaker, and printer. The apparatus 1000 may also typically include network connections 1020 (such as a network adapter) for coupling to other devices, computers, networks, servers, etc. using either wired or wireless signaling media.

The components of the device may be embodied in a distributed computing system. For example, a terminal device may incorporate input and output devices to present only the user interface, whereas processing component of the system are resident elsewhere. Likewise, processing functionality may be distributed across a plurality of processors.

The apparatus may generate and receive machine readable instructions, data structures, program modules or other data in a modulated data signal such as a carrier wave or other transport mechanism. The term "modulated data signal" means a signal that has one or more of its characteristics set or changed in such a manner as to encode information in the signal. This can include both digital, analog, and optical signals. By way of example, and not limitation, communication media includes wired media such as a wired network or direct-wired connection, and wireless media such as acoustic, RF, infrared and other wireless media. Communications media, including combinations of any of the above, should be understood as within the scope of machine readable media.

Figure 11:
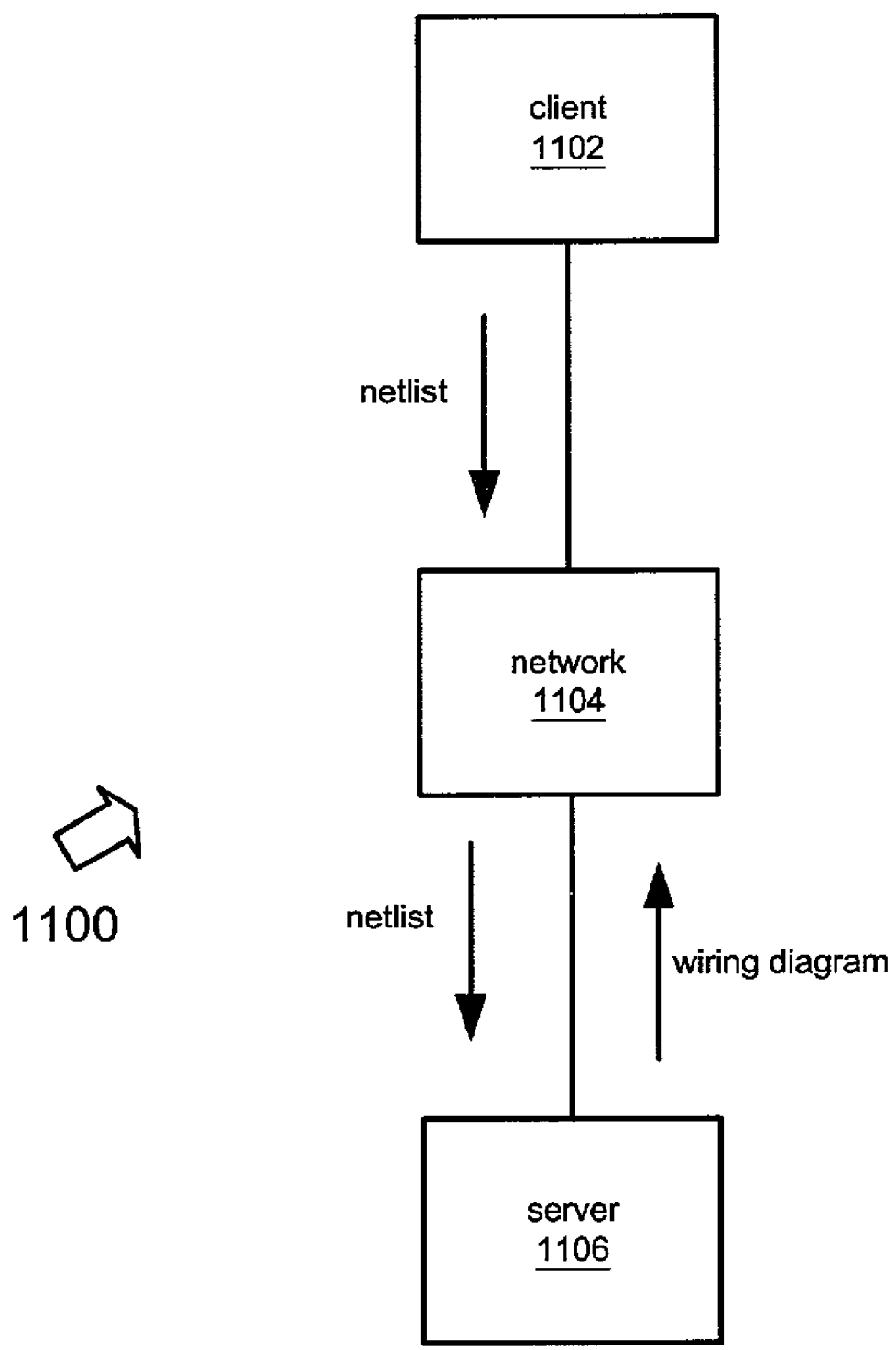
FIG. 11 is a block diagram illustrating a system for practicing embodiments of the present invention.

FIG. 11 shows a system 1100 in accordance with the present invention. A client device 1102 is coupled to a server device 1106 by way of a network 1104. The network 1004 may comprise various technologies for interconnecting devices, including switches, routers, and computers. Connection between the client 1002, server 1006, and the network 1004 may occur using various mediums, including copper wires, optical, and wireless mediums. In some embodiments, an apparatus similar to apparatus 1000 of FIG. 10 may be employed for the server 1006. The client device 1002 may also resemble apparatus 1000. Exemplary clients 1002 include computer workstations, desktop computers, laptop computers, set top boxes, hand-held devices such as palm pilots, and even wireless devices. The server may comprise an Internet server, a personal computer, a midrange computer, and even a mainframe computer, to name just a few of the possibilities. The server (and also possibly the client) may comprise multiple computing devices and associated peripherals—sometimes referred to as a 'site' or 'computing center'. In general, the client 1002 and the server 1006 may comprise any devices which each include a processor, memory, and network connectivity functionality.

In one embodiment, the client 1002 may communicate a netlist to the server 1006 by way of a carrier wave over the network 1004. The server 1006 may generate a wiring diagram in accordance with embodiments of the methods described herein. The server 1006 may then communicate the wiring diagram to the client 1002 as a carrier wave over the network 1004.

In other words, applications are contemplated in which a netlist is provided from a first device to a second device by way of a network. The second device produces the wiring diagram and communicates it back to the first device.

Having described and illustrated the present invention with reference to one or more illustrated embodiments, it will be recognized that the illustrated embodiments can be modified in arrangement and detail without departing from the principles and scope of the present invention. It should be understood that the programs, processes, or methods described herein are not related or limited to any particular type of data processing apparatus, unless indicated otherwise. Various types of general purpose or specialized data processing apparatus, including desktop computers and workstations, may be used with or perform operations in accordance with the teachings described herein. Elements of the illustrated embodiments may be implemented in software, hardware, firmware, or combinations thereof.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

We claim:

1. A computer-implemented method, comprising:
   inputting a netlist, the netlist comprising nodes identifying a plurality of interconnected components comprising a first component, a second component, and a third component, at least one connection between the first component and the second component, and at least one connection between the second component and the third component;
   determining a plurality of connectivity strengths comprising a first connectivity strength comprising a number of the at least one connection between the first component and the second component and a second connectivity strength comprising a number of the at least one connection between the second component and the third component;
   sorting the netlist at least in part according to the plurality of connectivity strengths, wherein the sorting comprises, upon determining that the first connectivity strength is greater than the second connectivity strength, sorting the first connectivity strength higher than the second connectivity strength;
   generating symbols and connections formed according to the netlist and at least in part according to the plurality of connectivity strengths; and
   generating a wiring harness diagram that comprises the symbols and the connections.

2. The method of claim 1 further comprising:
   sequencing symbol placement for the wiring harness diagram such that symbols with predetermined pin positions are placed in the wiring harness diagram with higher priority than symbols for which the side of the symbol for placing a pin may be selected.

3. The method of claim 1, wherein the wiring harness diagram corresponds to a wiring harness, the wiring harness comprising at least one bundle of signal-carrying wires.

4. The method of claim 3, wherein the signal-carrying wires carry electrical signals.

5. The method of claim 3, wherein the signal-carrying wires carry optical signals.

6. The method of claim 1, wherein the wiring harness diagram is generated along a selected wiring harness layout dimension.

7. The method of claim 1, wherein the wiring harness diagram represents a wiring harness that establishes connectivity between at least two components.

8. The method of claim 7, wherein at least one component is an electrical component.

9. The method of claim 7, wherein at least one component is an optical component.

10. The method of claim 1, wherein the act of generating a wiring harness diagram comprises resizing at least one symbol.

11. The method of claim 1, wherein the act of generating a wiring harness diagram comprises repositioning at least one symbol.

12. The method of claim 1, wherein the wiring harness diagram further comprises pins, wherein the act of generating the wiring harness diagram comprises arranging the pins to increase directness of connections between at least two symbols, and wherein at least one symbol is resized and at least one symbol is repositioned.

13. A computer-implemented method, comprising:
   inputting a netlist, the netlist comprising nodes identifying a plurality of interconnected components, wherein each of the plurality of interconnected components is represented by a symbol
   determining a connectivity strength for at least one pair of symbols, the connectivity strength comprising a number of connections existing between the at least one pair of symbols, the number of connections existing between the at least one pair of symbols being one or more;
   sorting the netlist at least in part according to the connectivity strength for the at least one pair of symbols;
   generating symbols and connections formed according to the netlist and at least in part according to the connectivity strength for the at least one pair of symbols;
   sequencing symbol placement in a wiring harness layout at least in part according to the connectivity strength for the at least one pair of symbols, the sequencing comprising determining whether at least one of the at least one pair of symbols has already been placed in the wiring harness layout; and
   generating a wiring harness diagram for at least one bundle according to the wiring harness layout, wherein the bundle comprises a plurality of wires.

14. The method of claim 13 further comprising:
selecting a side of a first symbol on which to position a pin to increase the directness of connectivity between the first symbol and a second symbol.

15. The method of claim 13 in which generating a wiring diagram according to the layout further comprises:
selecting sides of the symbols on which to position pins according to a selected layout dimension; and
arranging the pins on the selected sides to increase the directness of connections between the symbols.

16. The method of claim 15, wherein arranging the pins comprises resizing at least one symbol.

17. The method of claim 15, wherein arranging the pins comprises repositioning at least one symbol.

18. The method of claim 13 further comprising:
sequencing symbol placement for the wiring harness diagram such that symbols with predetermined pin positions are placed in the layout with higher priority than symbols for which the side of the symbol for placing a pin may be selected.

19. A computer-implemented method, comprising:
inputting a netlist, the netlist comprising nodes identifying a plurality of interconnected components, wherein each of the plurality of interconnected components is represented by a symbol
determining a connectivity strength for at least one pair of symbols, the at least one pair of symbols having at least one connection in-between, the connectivity strength being determined by the at least one connection in-between the at least one pair of symbols;
sorting the netlist at least in part according to the connectivity strength for the at least one pair of symbols;
generating symbols and connections formed according to the netlist and at least in part according to the connectivity strength for the at least one pair of symbols;
sequencing symbol placement in a wiring harness layout for at least one bundle comprising signal-carriers, at least in part according to the connectivity strength for the at least one pair of symbols; and
selecting a side of a first symbol on which to place a pin to increase the directness of connectivity between the first symbol and a second symbol.

20. The method of claim 19 in which selecting the side of the first symbol further comprises:
selecting the side according to a selected layout dimension and a position of the second symbol.

21. The method of claim 19 further comprising:
sequencing symbol placement for the wiring harness layout such that symbols with predefined pin positions are placed in the layout with higher priority than symbols for which the side of the symbol for placing a pin may be selected.

22. An article comprising:
a machine-readable media comprising instructions which, when executed by the processor of a data processing device, result in:
inputting a netlist, the netlist comprising nodes identifying a plurality of interconnected components comprising a first component, a second component, and a third component, at least one connection between the first component and the second component, and at least one connection between the second component and the third component;
determining a plurality of connectivity strengths comprising a first connectivity strength comprising number of the at least one connection between the first component and the second component and a second connectivity strength comprising a number of the at least one connection between the second component and the third component;
sorting the netlist at least impart according to the plurality of connectivity strengths:
wherein the sorting comprises, upon determining that the first connectivity strength is greater than the second connectivity strength, sorting the first connectivity strength higher than the second connectivity strength
generating symbols and connections formed according to the netlist and at least in part according to the plurality of connectivity strengths; and
generating a wiring harness diagram that comprises the symbols and the connections.

23. The article of claim 22 in which the instructions, when executed by the processor to generate the symbols, further result in:
positioning a pin on a side of the first symbol, the side selected according to a connection between the first symbol and the second symbol.

24. The article of claim 22 in which the instructions, when executed by the processor, further result in:
sequencing symbol placement for the wiring harness diagram such that symbols with predetermined pin positions are placed in the wiring harness diagram with higher priority than symbols for which the side of the symbol for placing a pin may be selected.

25. An article comprising:
a machine-readable media comprising instructions which, when executed by the processor of a data processing device, result in:
inputting a netlist, the netlist comprising nodes identifying a plurality of interconnected components, wherein each of the plurality of interconnected components is represented by a symbol
determining a connectivity strength for at least one pair of symbols, the connectivity strength comprising a number of connections existing between the at least one pair of symbols, the number of connections existing between the at least one pair of symbols being one or more;
sorting the netlist at least in part according to the connectivity strength for the at least one pair of symbols;
generating symbols and connections formed according to the netlist and at least in part according to the connectivity strength for the at least one pair of symbols;
sequencing symbol placement in a wiring harness layout at least in part according to the connectivity strength for the at least one pair of symbols, the sequencing comprising determining whether at least one of the at least one pair of symbols has already been placed in the wiring harness layout; and
generating a wiring harness diagram for at least one bundle according to the wiring harness layout, wherein the bundle comprises a plurality of wires.

26. The article of claim 25 in which the instructions, when executed by the processor, further result in:
selecting a side of a first symbol on which to position a pin to increase the directness of connectivity between the first symbol and a second symbol.

27. The article of claim 25 in which the instructions, when executed by the processor to generate the wiring harness diagram, further result in:
selecting sides of the symbols on which to position pins according to a selected layout dimension.

28. The article of claim 25 in which the instructions, when executed by the processor, further result in:

sequencing symbol placement for the wiring harness diagram such that symbols with predetermined pin positions are placed in the layout with higher priority than symbols for which the side of the symbol for placing a pin may be selected.

29. An article comprising:

a machine-readable media comprising instructions which, when executed by the processor of a data processing device, result in:

inputting a netlist, the netlist comprising nodes identifying a plurality of interconnected components, wherein each of the plurality of interconnected components is represented by a symbol determining a connectivity strength for at least one pair of symbols, the at least one pair of symbols having at least one connection in-between, the connectivity strength being determined by the at least one connection in-between the at least one pair of symbols;

sorting the netlist at least in part according to the connectivity strength for the at least one pair of symbols;

generating symbols and connections formed according to the netlist and at least in part according to the connectivity strength for the at least one pair of symbols;

sequencing symbol placement in a wiring harness layout for at least one bundle comprising signal-carriers, at least in part according to the connectivity strength for the at least one pair of symbols; and selecting a side of a first symbol on which to place a pin to increase the directness of connectivity between the first symbol and a second symbol.

30. The article of claim 29 in which the instructions, when executed by the processor to select the side of the first symbol, further result in:

selecting the side according to a selected wiring harness layout dimension and a position of the second symbol.

31. The article of claim 29 in which the instructions, when executed by the processor, further result in:

sequencing symbol placement for the wiring harness layout such that symbols with predefined pin positions are placed in the layout with higher priority than symbols for which the side of the symbol for placing a pin may be selected.

32. An apparatus comprising:

a processor; and a machine readable media comprising instructions which, when executed by the processor, result in:

inputting a netlist, the netlist comprising nodes identifying a plurality of interconnected components comprising a first component, a second component, and a third component, at least one connection between the first component and the second component, and at least one connection between the second component and the third component;

determining a plurality of connectivity strengths comprising a first connectivity strength comprising a number of the at least one connection between the first component and the second component and a second connectivity strength comprising a number of the at least one connection between the second component and the third component;

sorting the netlist at least in part according to the plurality of connectivity strengths;

wherein the sorting comprises, upon determining that the first connectivity strength is greater than the second connectivity strength, sorting the first connectivity strength higher than the second connectivity strength generating symbols and connections formed according to the netlist and at least in part according to the plurality of connectivity strengths; and generating a wiring harness diagram that comprises the symbols and the connections.

33. The apparatus of claim 32 in which the instructions, when executed by the processor to generate the symbols, further result in:

positioning a pin on a side of the first symbol, the side selected according to a connection between the first symbol and the second symbol.

34. The apparatus of claim 32 in which the instructions, when executed by the processor, further result in: sequencing symbol placement for the wiring harness layout such that symbols with predetermined pin positions are placed in the wiring harness diagram with higher priority than symbols for which the side of the symbol for placing a pin may be selected.

35. An apparatus comprising;

a processor; and a machine-readable media comprising instructions which, when executed by the processor, result in:

inputting a netlist, the netlist comprising nodes identifying a plurality of interconnected components, wherein each of the plurality of interconnected components is represented by a symbol determining a connectivity strength for at least one pair of symbols, the connectivity strength comprising a number of connections existing between the at least one pair of symbols, the number of connections existing between the at least one pair of symbols being one or more;

sorting the netlist at least in part according to the connectivity strength for the at least one pair of symbols;

generating symbols and connections formed according to the netlist and at least in part according to the connectivity strength for the at least one pair of symbols;

sequencing symbol placement in a wiring harness layout at least in part according to the connectivity strength for the at least one pair of symbols, the sequencing comprising determining whether at least one of the at least one pair of symbols has already been placed in the wiring harness layout; and generating a wiring harness diagram for at least one bundle according to the wiring harness layout, wherein the bundle comprises a plurality of wires.

36. The apparatus of claim 35 in which the instructions, when executed by the processor, further result in:

selecting a side of a first symbol on which to position a pin to increase the directness of connectivity between the first symbol and a second symbol.

37. The apparatus of claim 36 in which the instructions, when executed by the processor to generate the wiring harness diagram, result in:

selecting sides of the symbols on which to position pins according to a selected layout dimension; and arranging the pins on the sides to increase the directness of connection between the symbols.

38. The apparatus of claim 36 in which the instructions, when executed by the processor, further result in:

sequencing symbol placement for the wiring harness layout such that symbols with predetermined pin positions are placed in the layout with higher priority than symbols for which the side of the symbol for placing a pin may be selected.

39. An apparatus comprising:
a processor; and
a machine-readable media comprising instructions which, when executed by the processor, result in:
inputting a netlist, the netlist comprising nodes identifying a plurality of interconnected components, wherein each of the plurality of interconnected components is represented by a symbol
determining a connectivity strength for at least one pair of symbols, the at least one pair of symbols having at least one connection in-between, the connectivity strength being determined by the at least one connection in-between the at least one pair of symbols;
sorting the netlist at least in part according to the connectivity strength for the at least one pair of symbols;
generating symbols and connections formed according to the netlist and at least in part according to the connectivity strength for the at least one pair of symbols;
sequencing symbol placement in a wiring harness layout for at least one bundle comprising signal-carriers, at least in part according to the connectivity strength for the at least one pair of symbols; and
selecting a side of a first symbol on which to place a pin to increase the directness of connectivity between the first symbol and a second symbol.

40. The apparatus of claim 39 in which the instruction, when executed by the processor to select the side of the first symbol, result in:
selecting the side according to a selected layout dimension and a position of the second symbol.

41. The apparatus of claim 39 in which the instructions, when executed by the processor, further result in:
sequencing symbol placement for the layout such that symbols with predefined pin positions arc placed in the layout with higher priority than symbols for which the side of the symbol for placing a pin may be selected.

* * * * *